US012736350B2

(12) United States Patent
Lang et al.

(10) Patent No.: US 12,736,350 B2
(45) Date of Patent: Sep. 15, 2026

(54) SYSTEMS AND METHODS FOR GENERATING A PATH FOR THROUGH AN AIRPORT TERMINAL

(71) Applicant: UNITED AIRLINES, INC., Chicago, IL (US)

(72) Inventors: Adam Lang, Chicago, IL (US); Anthony Cozzi, Chicago, IL (US); Angela Lee, Los Angeles, CA (US); Lidia Jose, Naperville, IL (US)

(73) Assignee: UNITED AIRLINES, INC., Chicago, IL (US)

( * ) Notice: Subject to any disclaimer, the term of this patent is extended or adjusted under 35 U.S.C. 154(b) by 71 days.

(21) Appl. No.: 18/978,883

(22) Filed: Dec. 12, 2024

(65) Prior Publication Data

US 2026/0168798 A1 Jun. 18, 2026

(51) Int. Cl.
*G01C 21/20* (2006.01)

(52) U.S. Cl.
CPC .................................. *G01C 21/206* (2013.01)

(58) Field of Classification Search
CPC .................................................... G01C 21/206
See application file for complete search history.

(56) References Cited

U.S. PATENT DOCUMENTS 8,700,250 B1 4/2014 Curtis et al.
12,165,456 B2 * 12/2024 Mori .................... G06Q 50/265
2015/0330797 A1 * 11/2015 Shukla ............... B64D 11/0015 701/533
2017/0292851 A1 * 10/2017 Chen .................... G01C 21/362
2018/0087911 A1 3/2018 Silverstein
2018/0218463 A1 8/2018 Jobling et al.
2018/0245925 A1 * 8/2018 Chen ....................... H04W 4/02
2019/0376793 A1 12/2019 Krome et al.
2021/0041246 A1 * 2/2021 Kukreja ............. G06Q 30/0282
2023/0334927 A1 * 10/2023 Mori .................. G07C 9/00563
2025/0046139 A1 * 2/2025 Mori ...................... G06Q 10/08
2025/0046140 A1 * 2/2025 Mori ...................... G06Q 10/00

OTHER PUBLICATIONS

International Search Report and Written Opinion for Application No. PCT/US2025/059309, dated Apr. 20, 2026.

* cited by examiner

*Primary Examiner* — Tarek Elarabi
(74) *Attorney, Agent, or Firm* — MARSHALL, GERSTEIN & BORUN LLP

(57) ABSTRACT

A system may receive a flight indicator associated with a user account of a user and identify airport location details saved in a database using the flight indicator. The airport location details include at least one terminal associated with the flight indicator. The system may select a plurality of landmark locations within the at least one terminal based on the airport location details and user data associated with the user account, generate a path for the user through the at least one terminal that includes a plurality of route segments for reaching each of the plurality of landmark locations which minimizes a duration or distance to a final landmark location within the plurality of landmark locations; and transmit at least a portion of the path to a user device for display thereon.

18 Claims, 10 Drawing Sheets

SYSTEMS AND METHODS FOR GENERATING A PATH FOR THROUGH AN AIRPORT TERMINAL

TECHNICAL FIELD

The present disclosure generally relates to systems for guiding user through an airport terminal in relation to a planned flight, and, more particularly, to systems and methods for generating a path through an airport terminal.

BACKGROUND

Airports are complex and varied with non-intuitive service offerings that make easy and efficient navigation difficult for travelers. These complexities are further exacerbated by unclear and overlapping eligibility rules for travelers with respect to the various airport service offerings. Furthermore, general mapping products that rely on the global positioning satellite (GPS) infrastructure are both unreliable at indoor navigation and do not have access to the full set of user data needed to generate complete and efficient terminal guide paths for travelers. Existing solutions have generally provided large sections of unstructured text information to travelers and required each traveler to individually parse this information (e.g., the specific policies, services, and airport layouts) when navigating through an airport terminal.

As such there is a need for improved systems and methods that remove the guesswork out of airport travel, and aggregate all of the available airport services, traveler attributes, and eligibilities to synthesize a single efficient path that navigates travelers to optimal service delivery points, makes the traveler's journey faster and less stressful, and reduces service delivery costs.

SUMMARY

In some aspects, the techniques described herein relate to a computer system including: one or more processors; and one or more non-transitory, computer-readable media storing instructions that, when executed by the one or more processors, cause the computer system to: receive a flight indicator associated with a user account of a user; identify airport location details saved in a database using the flight indicator, the airport location details including at least one terminal associated with the flight indicator; select a plurality of landmark locations within the at least one terminal based on the airport location details and user data associated with the user account; generate a path for the user through the at least one terminal that includes a plurality of route segments for reaching each of the plurality of landmark locations which minimizes a duration or distance to a final landmark location within the plurality of landmark locations; and transmit at least a portion of the path to a user device for display thereon.

In some aspects, the techniques described herein relate to a computer-implemented method for generating a path for a user through an airport terminal, the method including: receiving, at one or more processors, a flight indicator associated with a user account of a user; identifying, by the one or more processors, airport location details saved in a database using the flight indicator, the airport location details including at least one terminal associated with the flight indicator; selecting, by the one or more processors, a plurality of landmark locations within the at least one terminal based on the airport location details and user data associated with the user account; generating, by the one or more processors, a path for the user through the at least one terminal that includes a plurality of route segments for reaching each of the plurality of landmark locations which minimizes a duration or distance to a final landmark location within the plurality of landmark locations; and transmitting, by the one or more processors, at least a portion of the path to a user device for display thereon.

BRIEF DESCRIPTION OF THE DRAWINGS

The Figures described below depict various aspects of the system and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

The Figures depict preferred embodiments for purposes of illustration only. Alternative embodiments of the systems and methods illustrated herein may be employed without departing from the principles of the invention described herein.

DETAILED DESCRIPTION

The systems and methods described herein seamlessly integrate various passenger details and itinerary specifics, from ground transportation choices to baggage handling needs and special service requirements to automatically generate an efficient and user customized path through various airport terminals associated with a planned trip. The systems and methods described herein generate and update this customized path by accessing databases and systems that compile large amounts of airport information both statically and/or on a real time basis. The systems and methods described herein compile comprehensive insights into terminal layouts, service counters, security protocols, and immigration procedures to generate the path using the complete wealth of data to provide travelers with tailored advice for optimal drop-off, connections, arrivals, etc. Furthermore, the systems and methods described herein provide improved interaction between a remote server system used to generate the customized and a user device that displays the path. In particular, the systems and methods include improved configurations for triggering display of portions of the customized path and for identifying and generating an updated path in response to changes to the airport information or user information used to generate the customized path.

Figure 1:
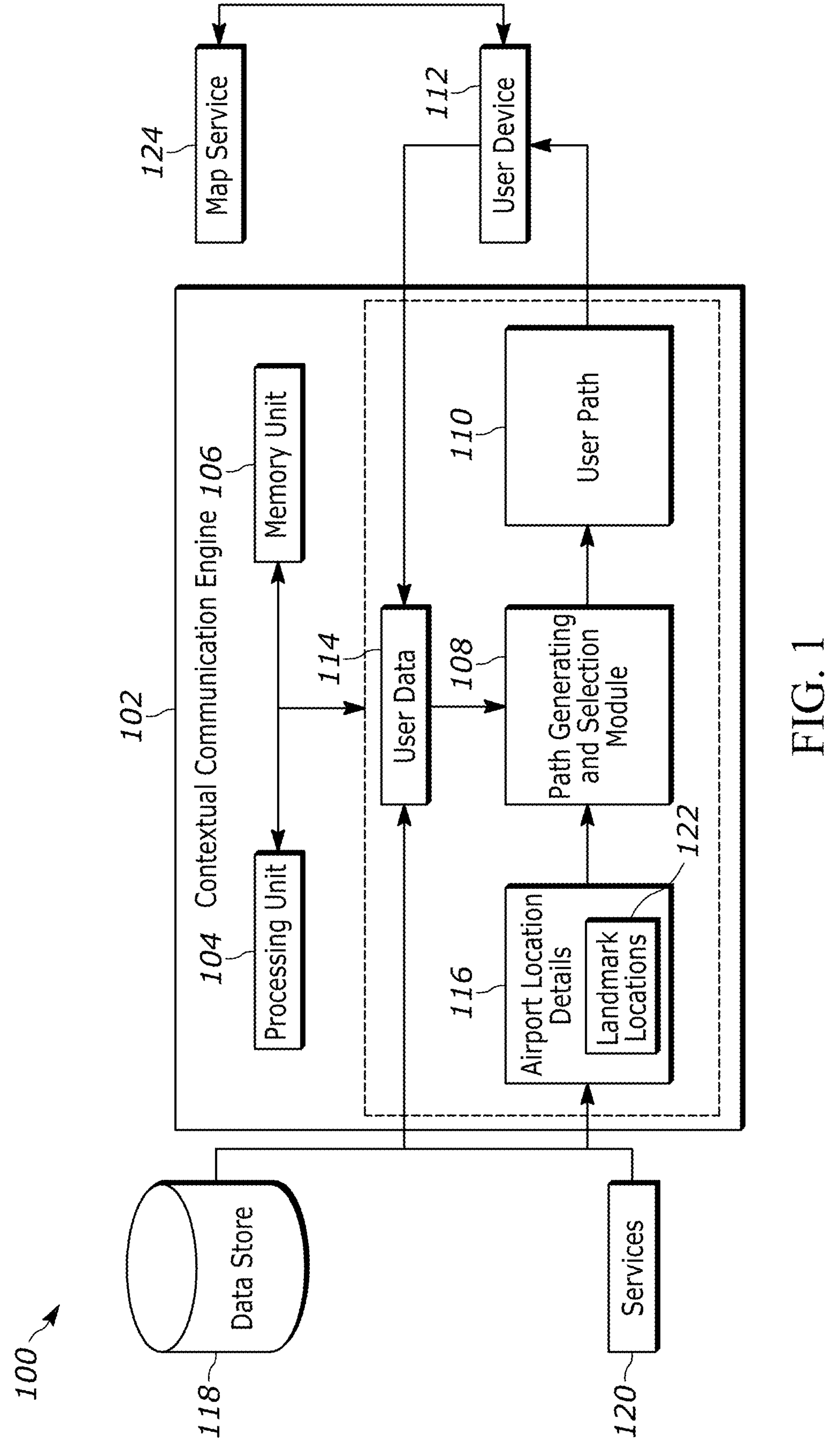
FIG. 1 illustrates a block diagram of an example system for generating a path through an airport terminal, in accordance with various embodiments disclosed herein.

FIG. 1 illustrates a block diagram of an example system 100 for generating a path through an airport terminal. The system 100 includes a Contextual Communication Engine (CCE) 102 such as a local server, remote cloud server, computer, tablet, etc. The CCE 102 may include a processing unit 104 and a memory unit 106.

Processing unit 104 includes one or more processors, each of which may be a programmable microprocessor or the like that executes software or other computing instructions stored in memory unit 106 to execute some or all of the functions of the system 100 as described herein. Processing unit 104 may include one or more graphics processing units (GPUs) and/or one or more central processing units (CPUs), for example. Alternatively, or in addition, one or more processors in processing unit 104 may be other types of processors (e.g., application-specific integrated circuits (ASICs), field-programmable gate arrays (FPGAs), etc.), and some of the functionality of the system 100 as described herein may instead be implemented in hardware.

Memory unit 106 may include one or more volatile and/or non-volatile memories. Any suitable memory type or types may be included in memory unit 106, such as read-only memory (ROM) and/or random access memory (RAM), flash memory, a solid-state drive (SSD), a hard disk drive (HDD), and so on. Collectively, memory unit 106 may store one or more software applications, the data received/used by those applications, and the data output/generated by those applications. In particular, the memory unit 106 may store instructions for specific modules of the CCE 102 as described herein.

In particular, the memory unit 106 stores the software and instructions that, when executed by processing unit 104, perform various functions of the CCE 102 related to execution of a path generating and selection module 108. In particular, the path generating and selection module 108 generates a path 110 for guiding a user through an airport terminal. The path 110 is transmitted in whole or in discrete portions to a user device 112 that is operatively coupled to the CCE 102. As shown in FIG. 1, the path generating and selection module 108 may generate the path 110 based on user data 114 and airport location details 116.

The user data 114 may be associated with a user account for a user of the user device 112. The user data 114 may include data collected from the user device 112, a data store 118 operatively coupled to the CCE 102, and/or services 120. In general, the user data 114 may include data that indicates one or more user preferences and/or one or more user statuses. For example, a user preference may indicate a preferred airport arrival or departure method (e.g., public transit, personal vehicle, taxi cab, ride share, rental car, family friend drop off or pick up, etc.), a preferred baggage handling method (e.g., check or carry on), path routing preferences (e.g., minimize time to a gate, include different intermediate stops, travel with a companion, etc.). A user status may indicate enrollment and/or accessibility by the user of particular airport related services such as global entry, TSA PreCheck, rental car providers, ride share providers, lounge access, etc. The user preferences or status may include default values selected by a user input (e.g., input to the user device 112) or assigned by the CCE 102. Alternatively, the user preferences or status may include trip specific values that override the default values.

The airport location details 116 may also be retrieved from the data store 118 and/or the services 120. In general, the airport location details 116 may indicate features of an arrival, layover, and/or a departure terminal of one or more airports associated with a planned flight linked to the user account. In some embodiments, the CCE 102 may receive a flight indicator for the planned flight and use the flight indicator to retrieve the airport location details 116.

The flight indicator may be received as part of a pull request to generate the path 110 from the user device 112 or as push request to generate the path 110 from one of the services 120. For example, the user device 112 may send a request that includes the flight indicator to the CCE 102 to generate the path 110 based on user input to a user interface of the user device 112. In some embodiments, the request from the user device 112 may include an indicator for the user account and other aspects of the user data 114 which the CCE 102 may use to retrieve the flight indicator, additional portions of the user data 114, and/or the airport location details 116 as described herein. In the case of the push request, one of the services 120 may trigger the CCE 102 to generate the path 110 in response to some trigger condition being met. Example trigger conditions may include, but are not limited to, a set time prior to scheduled departure of the flight, a geofenced location for the user device 112 (e.g., within a specific distance of the airport or away from a home location of the device), the user's flight check in status, etc.

As shown in FIG. 1, the airport location details 116 may include landmark locations 122 that indicate different locations within the airport arrival and/or departure terminals associated with the planned flight (e.g., locations of baggage claim, ground transportation options, security checkpoints, check-in counters, bag drop off areas, stores, restaurants, airport lounges, etc.). The airport location details 116 may also include current flight data for departing and arriving flights at the airports or relevant terminals for the planned flight, specific details on the planned flight, and/or real time and general details for the landmark locations 122 (e.g., scheduled operation hours, real time availability markers, etc.).

The data store 118 may be implemented as a database, data lake, memory, or other digital storage medium known in the art. Accordingly, the data store 118 may be a file system data store, an object-based data store, or other type of data store utilized in the art. Depending on the embodiment, the data store 118 may be implemented locally at the CCE 102, externally at an external data storage service, or a combination thereof. The CCE 102, via the processing unit 104, may be in wired or wireless communication with the external data storage service.

The services 120 may include additional computing and/or data storage systems operatively connected to the CCE 102. For example, the services 120 may include, but are not limited to, a flight check-in system, a user attribute management system, a flight reservation system, a flight data system, an airport attribute management system, etc. Each of these systems may host portions of the user data 114 and the airport location details 116 as described herein. Furthermore, the CCE 102 may request these portions of the user data 114 and the airport location details 116 from the services 120 on an as needed basis to generate the path 110 and/or may aggregate and buffer these portions of the user data 114 and the airport location details 116 in the data store 118 for use by the CCE 102 when generating the path 110.

The flight check-in system, user attribute management system, and the flight reservation system, may each host portions of the user data 114. In particular, the flight check-in system may host data that indicates a check-in status of the user; a checked bag indication for the user; and/or receipt of user status information (e.g., TSA PreCheck information, global entry information, lounge access information, airline status information, etc.). The user attribute management system may host data such as saved user statuses, default user preferences, trip selected preferences etc. The flight reservation system may host data that indicates user disability requests; unaccompanied minors requests; a scheduled departure airport; a scheduled departure time; a scheduled arrival airport; and/or a scheduled arrival time.

The flight data system may host portions of the airport location details 116 that indicate an actual departure airport for the planed flight; departure terminals at the departure airport; departure gates at the departure airport; departure times for flights from the departure airport; departure gate location coordinates for the departure gates; an actual arrival airport for the planned flight; arrival terminals at the arrival airport; arrival gates at the arrival airport; arrival times for planes at the arrival airport; arrival gate location coordinates for the arrival gates; bag carousel; carousel location coordinates; actual departure time for the planned flight; actual arrival time for the planned flight; and/or a flight status disposition for the planned flight.

The airport attribute management system may host portions of the airport location details 116 that indicate features of the arrival and or departure airport for the planned flight such as arrival methods and locations; lobby services, eligibility, locations, and hours; security services, eligibility, locations, and hours; departure immigration presence and locations; customs and border control pre-clearance presence and locations; arrival immigration presence and locations; arrival customs presence and locations; bag re-check presence and locations; departure methods and locations; ride share availability; and/or amenities (e.g. kids' play areas, animal relief areas, etc.). In some embodiments, the portions of the airport location details 116 that indicate features of the arrival and or departure airport may include a sequence of steps that describes a sequenced relationship between different locations of the arrival and or departure airport. For example, the sequence of steps may describe an order in which different airport locations (e.g., the landmark locations 122 occur on a generic route between a terminal entrance/exit and the secured area that contains the departure/arrival gates. When generating the services path 110, the path generating and selection module 108 may reference the sequence of steps to ensure that the path 110 is properly traversable by the user (e.g., the path 110 includes the landmark locations 122 in an order consistent with the sequence of steps).

Additional examples of the services 120 may host portions of the user data 114 and/or airport location details 116. For example, a loyalty services system may host data relating to user account loyalty data and a lounge services system may host airport lounge location information.

In general operation, after the user data 114 is received and the airport location details 116 are retrieved based on the flight indicator, the path generating and selection module 108 may select landmark locations 122 to be included in the path 110 based on other portions of the airport location details 116 and the user data 114. It should be appreciated that the landmark locations 122 selected by the path generating and selection module 108 for the path 110 may be a subset of all the landmark locations 122 included in the airport location details 116. In some embodiments, the landmark locations 122 included in the airport location details 116 may be a set of candidate landmark locations associated with the terminal (e.g., a departure terminal, and arrival, terminal, a layover terminal, etc.) associated with the flight indicator. In these embodiments, the path generating and selection module 108 may select at least one of the landmark locations 122 from the set of candidate landmark locations according to a user preference or status included in the user data 114.

For example, where the user data 114 includes an indication of an arrival or departure method to the terminal, the path generating and selection module 108 may select landmark locations 122 in the terminal that are associated with the indicated arrival or departure method. In some embodiments, the path generating and selection module 108 may select an exclusive area of the terminal (e.g., a restricted airport lounge, a TSA PreCheck security line, etc.) as at least one of the landmark locations 122. The path generating and selection module 108 may select the exclusive area when the user data 114 includes an indication of access rights to the exclusive area. Furthermore, the path generating and selection module 108 may consider operational hours for the landmark locations 122 when generating the path 110. In cases where the airport location details 116 include operational hours, the path generating and selection module 108 will select a landmark only when the landmark is open at least one hour before the scheduled departure time. If the airport location details 116 do not include operational hours for a landmark, the path generating and selection module 108 may be configured to consider the landmark as available 24 hours. In some embodiments, the path generating and selection module 108 may be configured to generate the path 110 so that all of the selected landmark locations 122 are within a single terminal. Additional details and example landmark locations 122 are discussed herein in connection with FIGS. 2A-2H.

After selecting the landmark locations 122, the path generating and selection module 108 may generate the path 110 so that the path 110 includes a route segment for reaching each of the selected landmark locations 122. The path generating and selection module 108 may generate these route segments to minimize a duration or distance to a final landmark location within the selected landmark locations 122.

For example, the path generating and selection module 108 may assign weights to a set of route segments within the airport according to their distance or expected duration. The path generating and selection module 108 may use a path-finding algorithm to select a subset of the route segments which minimize the duration or distance to the final landmark location. More specifically, the path generating and selection module 108 may select a subset of the route segments which reach each of the selected landmark locations 122 and have a minimum combined weight. In some embodiments, the path generating and selection module 108 may traverse each path from the user's current location to the selected landmark locations 122 including the final landmark location using the route segments and their corresponding weights to identify a path including a subset of the route segments having the lowest combined weight.

To determine the order of the selected landmark locations 122 for the user to travel to, the path generating and selection module 108 may use a traveling salesman problem (TSP) solver, such as a Concorde TSP solver, where each of the route segments between the user's current location, the selected landmark locations 122, and the final landmark location are assigned weights according to their distance or expected duration. The path generating and selection module 108 may select the path having the lowest combined weight while arriving at each of the selected landmark locations 122 and the final landmark location. In some embodiments, the order of the selected landmark locations 122 is predetermined or at least the order of some of the selected landmark locations 122 is predetermined. For example, the final landmark location may be predetermined to be the final destination. Additionally, a security checkpoint may be predetermined to be before a restaurant, a check-in counter may be predetermined to be before the security checkpoint, etc.

However, the path generating and selection module 108 may generate the route segments based on other considerations indicated by the user data 114. In some embodiments, the path generating and selection module 108 or another module of the CCE 102 may determine an expected duration for traversing each route segment in the route segments and provide indications of the expected durations to the user device 112 for display with the path 110. The expected duration may include an expected amount of time to pass through the selected one of the landmark locations 122 associated with the route segment.

Furthermore, the path generating and selection module 108 may include additional detail in the path 110 beyond the selected landmark locations 122 and the generated route segments in the path 110. For example, the path generating and selection module 108 may include navigation instructions (e.g., step by step instructions) for traversing the route segments between each of the selected landmark locations 122 within the path 110. The path generating and selection module 108 may also include an indication of path markers in the path 110 (e.g., signs or other detail in the terminal that may be used to mark the path 110). These additional details may be retrieved from the data store 118 and/or the services 120.

In some embodiments, the path generating and selection module 108 may generate multiple possible paths through the airport terminal(s) and select the path 110 as one of the possible paths. In these embodiments, the path generating and selection module 108 may identify multiple types of landmark locations 122 (e.g., bag drop locations, entrances, exists, security checkpoints, restaurants, news stands, etc.) based on the airport location details 116 and the user data 114. Then, the path generating and selection module 108 may construct a set of candidate paths through the terminal. Each candidate path may include candidate landmark locations corresponding to each of the types of landmark locations identified. The path generating and selection module 108 may then generate a score for each candidate path based on an expected duration or distance of the candidate path and select the path 110 from among the set of candidate paths based on the scores.

In some embodiments, the path generating and selection module 108 or another module of the CCE 102 may determine trigger conditions for displaying or transmitting to the user device 112 each route segment and a corresponding landmark location 122 on the path 110. In particular, the trigger conditions may include time values and/or sensor readings of the user device 112 that indicate when the user device 112 is to display the route segments and corresponding landmark locations 122. For example, the sensor readings from the user device 112 used as the trigger conditions may include gyroscope or accelerometer values (e.g., values indicating the device laying flat for a period of time consistent with passing through a security scanner), GPS data, location beacon signal data, etc.

The trigger conditions may enable real time modification of the path 110 as displayed on the user device 112. In particular, the landmark locations 122 displayed on a user interface display of the user device 112 (see e.g., the various landmark locations shown and described in connection with FIGS. 2A-2H) may automatically change as the user device 112 and/or the CCE 102 determine different trigger conditions to be met. The modification of the user interface display may result from local actions taken by the user device 112, remote actions taken by the CCE 102, or combinations thereof.

For example, in embodiments where the CCE 102 determines whether the trigger conditions are met, the CCE 102 may transmit or push portions of the path 110 to the user device 112 only after determining that the trigger conditions have been met. However, in some case, the CCE 102 may transmit the entire path 110 to the user device 112 after generation and instruct the user device 112 on which section of the path 110 to display at any moment in time based on the determinations with respect to the trigger conditions. Furthermore, in these embodiments, the CCE 102 may instruct the user device 112 (e.g., when sending the path 110) to transmit data back to the CCE 102 that the CCE 102 may use to determine whether the trigger conditions are met or not. Having the CCE 102 check the trigger conditions frees up processing resources at the user device 112 and also enables the CCE 102 to update the path 110 as described below when instructing the user device 112 on what to display thereon. As such the user of the user device 112 may only be presented with up to date accurate route segments and landmark locations 122.

However, in embodiments where the user device 112 determines whether the trigger conditions are met or not, the user device 112 may locally modify the user interface display to show relevant portions of the path 110 (e.g. different landmark locations 122 and route segments) responsive to the user device 112 determining that associated ones of the trigger conditions are met. In these embodiments, the CCE 102 may transmit the trigger conditions to the user device 112 along with the path 110. Having the user device 112 determine satisfaction of the trigger conditions enables dynamic display of relevant portions of the path 110 even in cases where there is a poor or non-existent network connection between the user device 112 and the CCE 102. Furthermore, in some embodiments, the user device 112 may be configured to offload the trigger condition checking to the CCE 102 as a default and initiate local trigger condition checking in case where the network connection to the CCE 102 is poor or unavailable. In this case, the system 100 gains the benefits of remote trigger checking (e.g., offloading processing to the CCE 102 and displaying up to date segments of the path 110) and local trigger checking (e.g., dynamic display of the path 110 irrespective of network connection status).

In some embodiments, the CCE 102 may update the path 110 in response to modifications to the user data 114 and/or the airport location details 116 (e.g., gate changes, terminal changes, departure or arrival time changes, user status changes, opening or closing of security checkpoints, etc.). The CCE 102 may detect the modifications by periodically monitoring the data managed by the services 120, receiving push updates on changed data from the services 120, and/or receiving revised user data 114 from the user device 112. In some embodiments, the CCE 102 may register with relevant ones of the services 120 to receive push updates of modifications to the airport location details 116 associated with the flight indicator. Having the CCE 102 register to receive particular updates limits the processing load of the CCE 102 and lessens the amount of network traffic needed to provide updates for the path 110 as compared with configurations where the CCE 102 continually monitors all the airport location details 116 for updates or changes.

Responsive to detecting the modifications, the path generating and selection module 108 may revise the path 110 based on the modifications and transmit at least a portion of the revised path to the user device 112. Additional example modifications may include an updated preference or status for the user account (e.g., a change to the arrival method or departure methos), a new gate assignment within the terminal, a new terminal assignment different from the terminal, or status change information on the landmark locations 122 within the terminal.

As shown in FIG. 1, in some embodiments, the system 100 may include a map service 124. The map service 124 may be configured to generate navigation maps through the airport terminals for display on the user device 112. The navigation maps may correspond to all or portions of the path 110 and may include indications of the selected landmark locations 122. The map service 124 may interface with the user device 112 or the CCE 102 via wired or wireless methods known in the art. Accordingly, the user device 112 or the CCE 102 may instruct the map service 124 to generate the navigation maps.

Figure 2A:
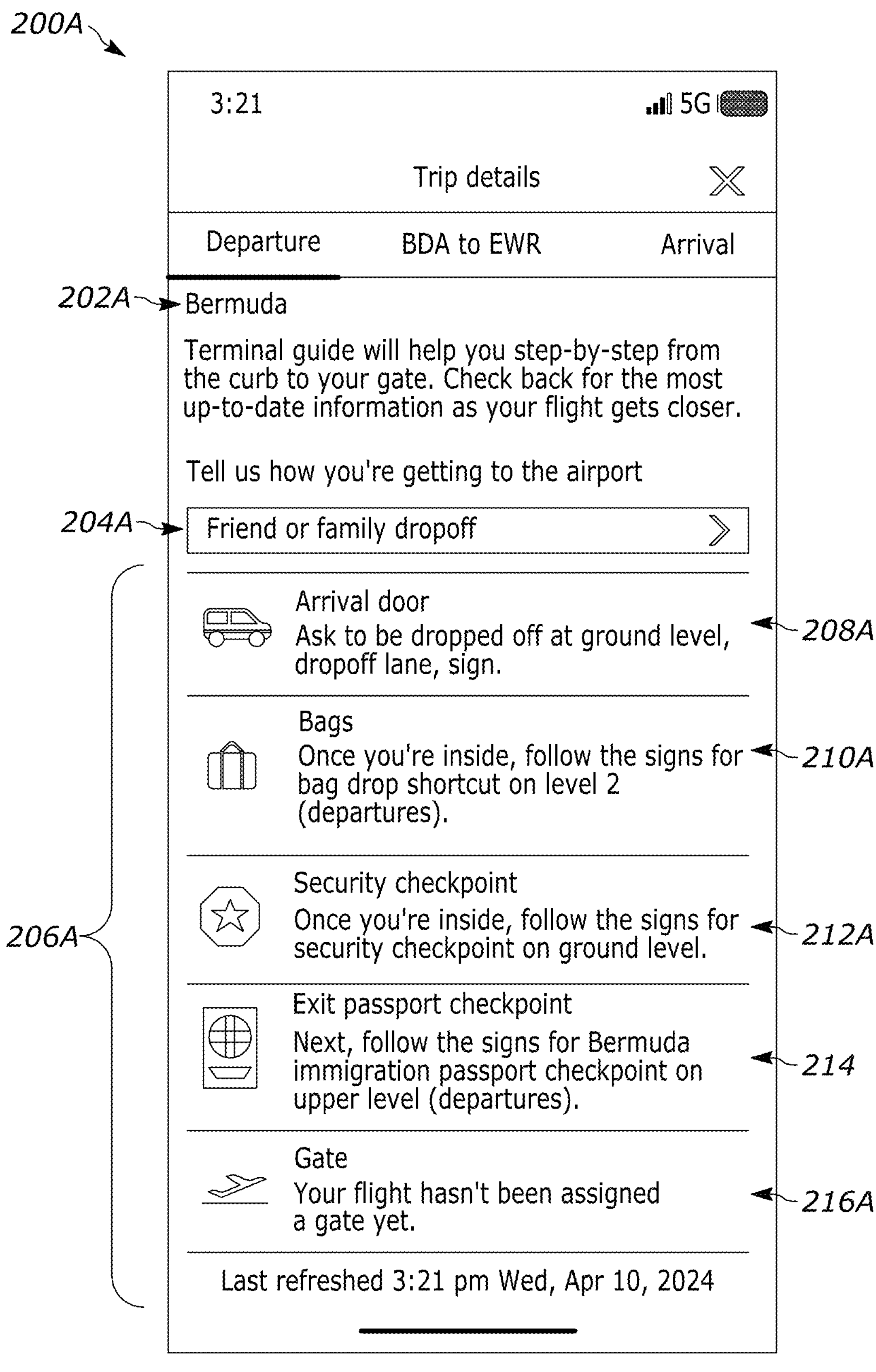
FIGS. 2A-2H illustrates example user interface screens of a client device showing portions of a path generated by the system of FIG. 1.
Figure 2B:
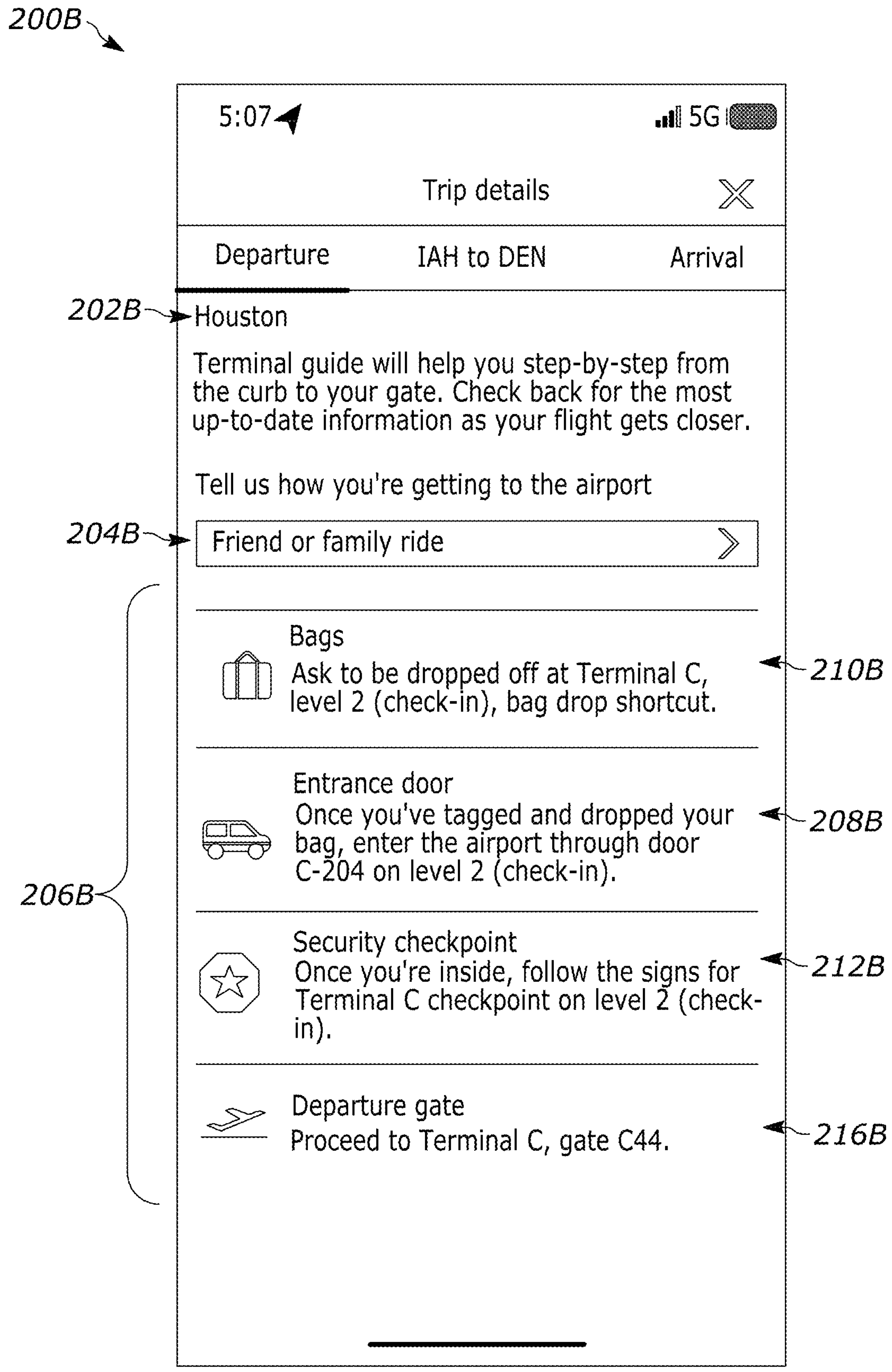

FIGS. 2A and 2B show example user interface screens 200A and 200B for display of an example path 110 on the user device 112. In particular, the user interface screens 200A and 200B show departure segments of different example paths through different airports and terminals as generated by the CCE 102 of FIG. 1. As shown in FIGS. 2A and 2B, the user interface screens 200A and 200B include an airport indicator 202A, 202B, a ground transportation selection box 204A, 204B, and departure airport landmark locations 206A and 206B for the departure segment of the different example paths. The departure airport landmark locations 206A shown in FIG. 2A and the departure airport landmark locations 206B shown in FIG. 2B each include a different composition of ordered landmark locations and route instructions that are selected and generated by the CCE 102 of FIG. 1. Furthermore, the differences between the departure airport landmark locations 206A shown in FIG. 2A and the departure airport landmark locations 206B arise from the different airport departure locations and flight plans (e.g., differences in the airport location details 116 and/or user data 114 used when generating each of the different example paths).

For example, the departure airport landmark locations 206A shown in FIG. 2A for departing from BDA airport in Bermuda include, in path order, an entrance landmark 208A, a bag drop landmark 210A, a security checkpoint landmark 212A, a passport landmark 214, and a departure gate landmark 216A.

In contrast, the departure airport landmark locations 206B shown in FIG. 2B for departing from IAH airport in Houston include, in path order, the bag drop landmark 210B, the entrance landmark 208B, the security checkpoint landmark 212B, and the departure gate landmark 216B. In particular, the departure airport landmark locations 206B differ from the departure airport landmark locations 206A in the order of the entrance landmarks 208A and 208B and the bag drop landmarks 210A and 210B and by omitting the passport landmark 214. The order of the entrance landmarks 208A and 208B and the bag drop landmarks 210A and 210B may be different because the relevant terminal at the IAH airport includes a curbside bag check while the relevant terminal of the BDA airport does not. The passport landmark 214 may be omitted because the trip from the IAH airport (indicated by the user data 114 or airport location details 116) does not involve international travel.

Further detailed discussion of the departure airport landmark locations 206A and 206B is included below with reference to FIGS. 1, 2A, and 2B.

The entrance landmarks 208A and 208B shown in FIGS. 2A and 2B are example entrance landmarks selected by the path generating and selection module 108. In general, the entrance landmark indicates the location selected by the path generating and selection module 108 where a user of the user device 112 should enter the departure airport. The path generating and selection module 108 may select the entrance landmark 208A and 208B based on portions of the user data 114 that indicate the ground transportation method the user of the user device 112 is using to arrive at the departure airport. In some embodiments, the ground transportation portions of the user data 114 may be set by user input to the ground transportation selection boxs 204A and 204B.

The bag drop landmarks 210A and 210B shown in FIGS. 2A and 2B are example bag drop landmarks selected by the path generating and selection module 108. In general, the bag drop landmark indicates the location selected by the path generating and selection module 108 where a user of the user device 112 should drop off checked baggage. The path generating and selection module 108 may select the bag drop landmarks 210A and 210B based on the ground transportation portions of the user data 114 and specific features of the departure airport noted in the airport location details 116.

For example, when the user data 114 includes an indication of checked bags and the airport location details 116 indicates the departure airport has a bag drop shortcut, the path generating and selection module 108 will select the bag drop landmark 210A or 210B as the bag drop shortcut. Furthermore, where the departure airport has multiple bag drop shortcuts (e.g., indoor and curb side shortcuts) the path generating and selection module 108 may select one of the multiple bag drop shortcuts as the bag drop landmark 210A or 210B based on the ground transportation portions of the user data 114. In particular, where the airport location details 116 indicates the departure airport has both curbside and indoor bag drop shortcuts and the ground transportation portions of the user data 114 indicate a curbside location on the same level as the curbside bag drop shortcut, the path generating and selection module 108 will select the curbside bag drop shortcut as the bag drop landmark 210A or 210B. However, where the ground transportation portions of the user data 114 indicate a curbside location on a different level from the curbside bag drop shortcut, the path generating and selection module 108 will select the indoor bag drop shortcut as the bag drop landmark 210A or 210B to avoid sending the user inside to use the stairs and then back outside to use the curbside bag drop shortcut. Furthermore, where the ground transportation portions of the user data 114 indicate a non-curbside arrival location (e.g., indoor from public transit, parking location, etc.) the path generating and selection module 108 will select the indoor bag drop shortcut as the bag drop landmark 210A or 210B.

In some embodiments, the path generating and selection module 108 may also select the bag drop landmark 210A and 210B based on portions of the user data 114 that indicate a special nature of the checked baggage. For example, when the user data 114 indicates the user has sports equipment checked bags and the departure airport has a sports equipment bag drop, the path generating and selection module 108 will select the sports equipment bag drop as the bag drop landmark 210A or 210B. The path generating and selection module 108 may also select between curbside and indoor sports equipment bag drop of locations based on the ground transportation portions of the user data 114 in the same manner described above for the bag drop shortcut.

In some embodiments, the path generating and selection module 108 may also select the bag drop landmark 210A or 210B based on the user status portions of the user data 114. For example, when the user data 114 indicates checked bags and the user has a special status (e.g., TSA PreCheck, airline status, etc.) and the airport location details 116 indicate that the departure airport has a special bag drop shortcut location associated with the special status, the path generating and selection module 108 may select the special status bag drop shortcut as the bag drop landmark 210A or 210B. The path generating and selection module 108 may also select between curbside and indoor special status drop of locations based on the ground transportation portions of the user data 114 in the same manner described above for the bag drop shortcut generally. However, in some embodiments, the user data 114 may indicate a preference for curbside bag drop off or a special bag drop shortcut location. In these embodiments, the path generating and selection module 108 will select the preferred option as the bag drop landmark 210A or 210B. For example, the path generating and selection module 108 may select an indoor special status bag drop shortcut location over a general curbside bag drop off location where the user data 114 indicates a preference for the special bag drop shortcut location.

In cases where the user data 114 does not include an indication of a checked bag, the path generating and selection module 108 may omit the bag drop landmark 210A or 210B. Furthermore, in some embodiments, the path generating and selection module 108 may include an option within the interface of the user device 112 for the user to add checked bags. This option may include a check-in area place holder landmark of the path 110 that include instruction for the user to bypass the check-in area or lobby of the airport and proceed to the next landmark location and rout segment (e.g., the security checkpoint landmark 212A or 212B). In some embodiments, the path generating and selection module 108 may select the check-in area place holder landmark for display over the bag drop landmark 210A or 210B where the user has yet to check-in to the planned flight and there has not been an affirmative selection of declination of checked bags for the planned flight. In these embodiments, the check-in area place holder landmark may include a message informing the user that the path 110 will be updated to include a bag drop landmark 210A or 210B after the user checks in for the planned flight.

In some embodiments, the path generating and selection module 108 may select a special service landmark as one of the selected landmark locations 122 based on the user status and trip detail portions of the user data 114 and details in the airport location details 116 that relate to the special services. This special service landmark may direct the user of the user device 112 to use the special services after the bag drop landmark 210A or 210B or as the bag drop landmark 210A or 210B. Example special services may include a Global Services Reception space or a Global Services counter that is selected, a wheelchair service area, an unaccompanied minor service area, a pet check-in service area, etc.

The security checkpoint landmarks 212A and 212B shown in FIGS. 2A and 2B are example security checkpoint landmarks selected by the path generating and selection module 108. In general, the security checkpoint landmark indicates the location selected by the path generating and selection module 108 where a user of the user device 112 should proceed for security screening and entrance into the secured area of the departure airport. The path generating and selection module 108 may select the security checkpoint landmark 212A or 212B based on the user status portions of the user data 114, status data (e.g., opened or closed) for on the security check points of the departure airport indicated in the airport location details 116, a distance or travel time from previous landmark locations within the path 110 (e.g., the entrance landmark 208A or 208B, the bag drop landmark 210A or 210B, the special service landmark, etc.), and/or other factors as described herein. For example, the security checkpoint landmark 212A or 212B may include, in prioritized order, one of a Global Services check point, a TSA PreCheck Touchless ID checkpoint, a TSA PreCheck plus CLEAR service checkpoint, a TSA PreCheck only checkpoint, a CLEAR only checkpoint, a Premier Access check point, or a general checkpoint.

In some cases, the path generating and selection module 108 may select the highest priority available checkpoint from the above options as the security checkpoint landmark 212A or 212B. In these cases, the path generating and selection module 108 determines that a checkpoint is available when the airport location details 116 indicate the checkpoint is open at a time when the user is present at the departure airport and the user data 114 includes a user status that indicates the user is eligible to use the checkpoint. In embodiments where there are multiple travelers with differing security eligibilities associated with a single planed flight, the path generating and selection module 108 may select the highest priority security type that all travelers are eligible for as the security checkpoint landmark 212A or 212B. However, in some cases, the path generating and selection module 108 may provide different paths for each of the multiple travelers based on each traveler's different specific security eligibilities. For example, the user data 114 may include a preference to divide the multiple travelers up into different paths or to keep each travel together in a single group.

The passport landmark 214 is an example passport landmark selected by the path generating and selection module 108. In general, the passport landmark indicates the location selected by the path generating and selection module 108 where the user of the user device 112 should go within the terminal of the departure airport for departure passport screening if required for the trip and available at the departure airport. In some embodiments, the passport landmark 214 may be located in the path 110 before the security checkpoint landmark 212A rather than afterwards as shown in the departure airport landmark locations 206A of FIG. 2A depending on the locations of the passport screening areas within different departure airports.

The departure gate landmarks 216A and 216B are example departure gate landmark selected by the path generating and selection module 108. In general, the departure gate landmark indicates the location selected by the path generating and selection module 108 where the planned flight is scheduled to depart from (e.g., the departure gate indicated in the airport location details 116). However, in some embodiments, the departure gate landmarks may be a place holder departure landmark (e.g., departure gate landmark 216A) for the path 110 in cases where a departure gate was not assigned for the planned flight at the time the path 110 was generated (see e.g., the differences between the departure gate landmarks 216A and 216B of departure airport landmark locations 206A vs 206B).

Figure 2C:
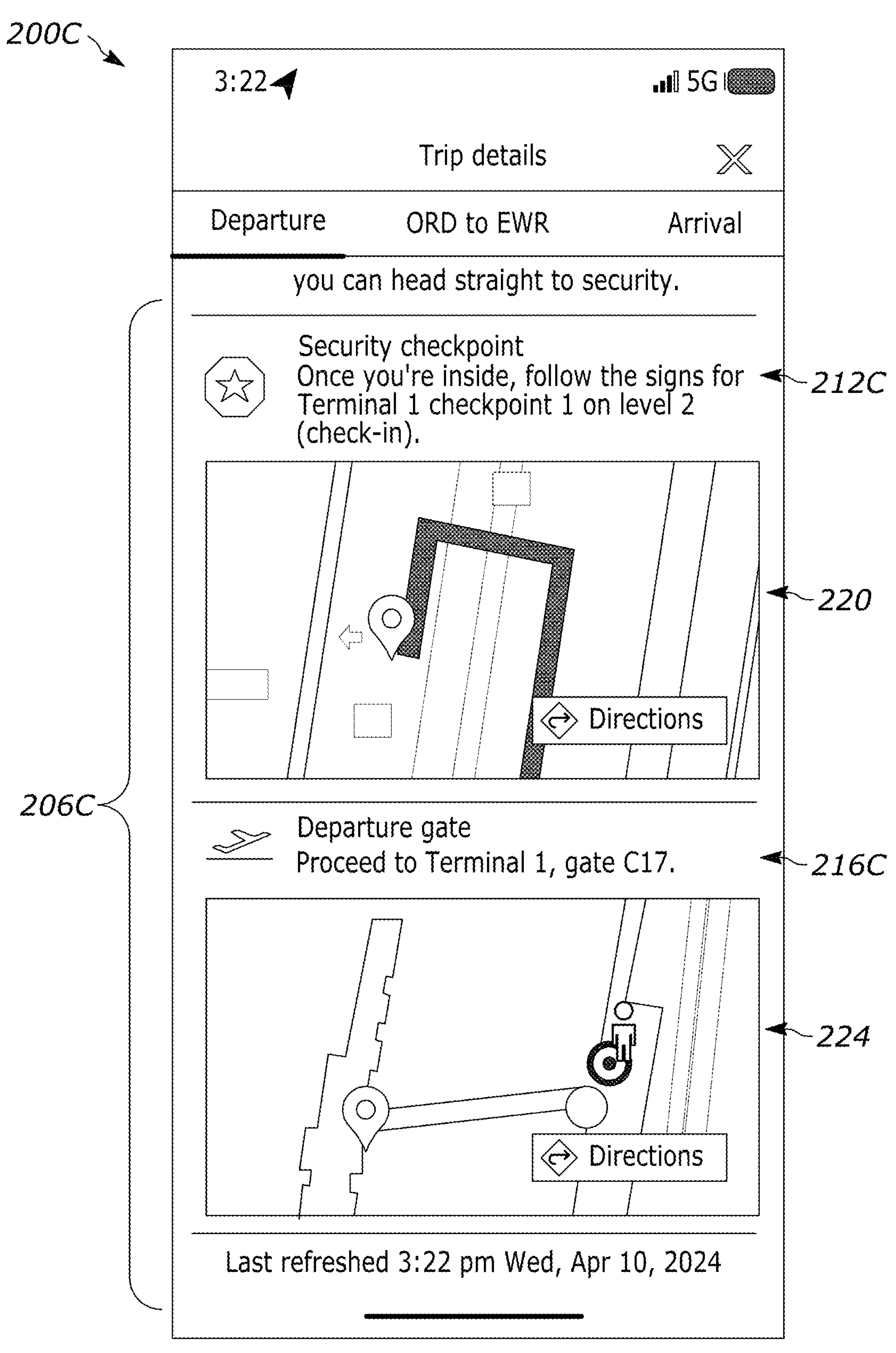

With reference now to FIG. 2C, another example user interface screen 200C for display of an example path 110 on the user device 112 is shown. The user interface screen 200C includes departure airport landmark locations 206C that include a security checkpoint landmark 212C and a departure gate landmark 216C that are similar in form and function to security checkpoint landmarks 212A and 212B and departure gate landmarks 216A and 216B, respectively. As shown in FIG. 2C, the user interface screen 200C also includes a security checkpoint map 220 displayed in conjunction with the security checkpoint landmark 212C and a departure gate map 224 in conjunction with the departure gate landmark 216C. The security checkpoint map 220 and departure gate map 224 may be generated by the map service 124 of FIG. 1 based on the selection of the security checkpoint landmark 212C and the departure gate landmark 216C by the path generating and selection module 108. It should be appreciated that additional arrangements of the security checkpoint map 220 and the departure gate map 224 beyond what is shown in FIG. 2C are possible. Furthermore, the departure airport landmark locations 206C may include additional landmark locations positioned above or below the security checkpoint landmark 212C and the departure gate landmark 216C as part of a scrolling area of the user interface screen 200C.

Figure 2D:
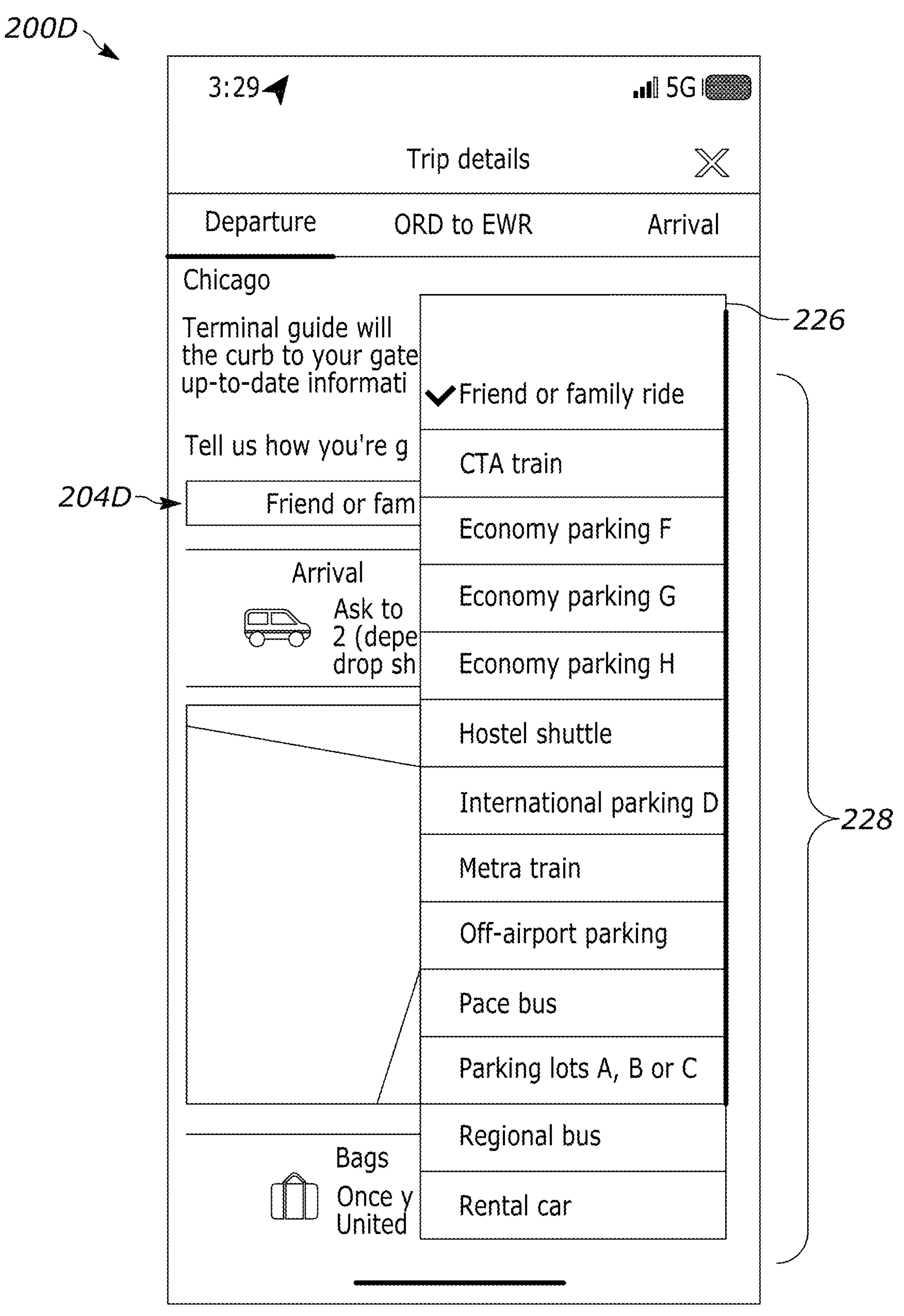

FIG. 2D shows another example user interface screen 200D for display of an example path 110 on the user device 112. In particular, the user interface screen 200D shows a pop-up screen element 226 trigged by user input to the ground transportation selection box 204D. As shown in FIG. 2D, the pop-up screen element 226 may include a list of selectable ground transportation options 228. The list of selectable ground transportation options 228 may be specific to the departure airport and may be included in the airport location details 116. In some embodiments, one option on the list of selectable ground transportation options 228 may be designated as a default option.

Figure 2E:
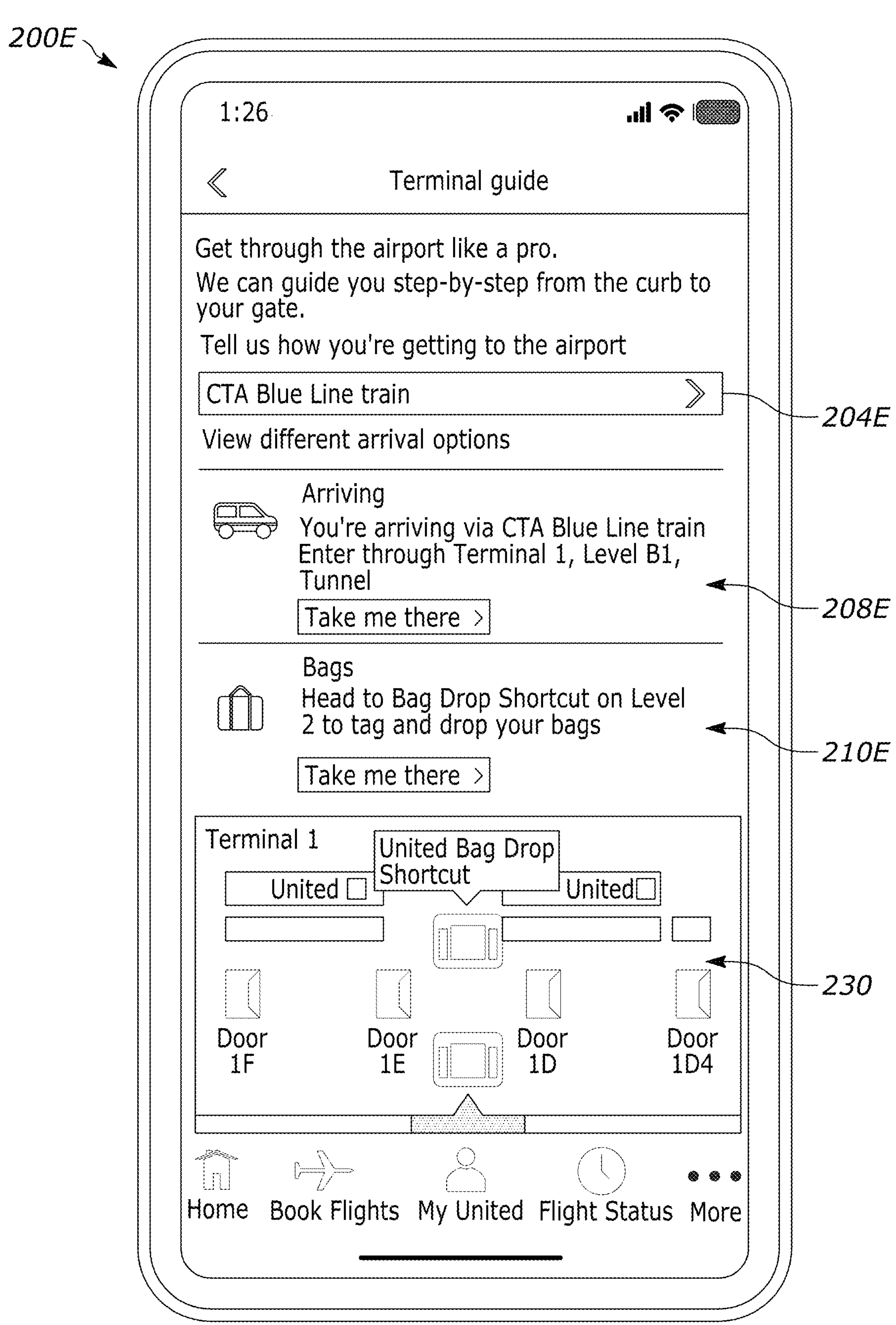
Figure 2F:
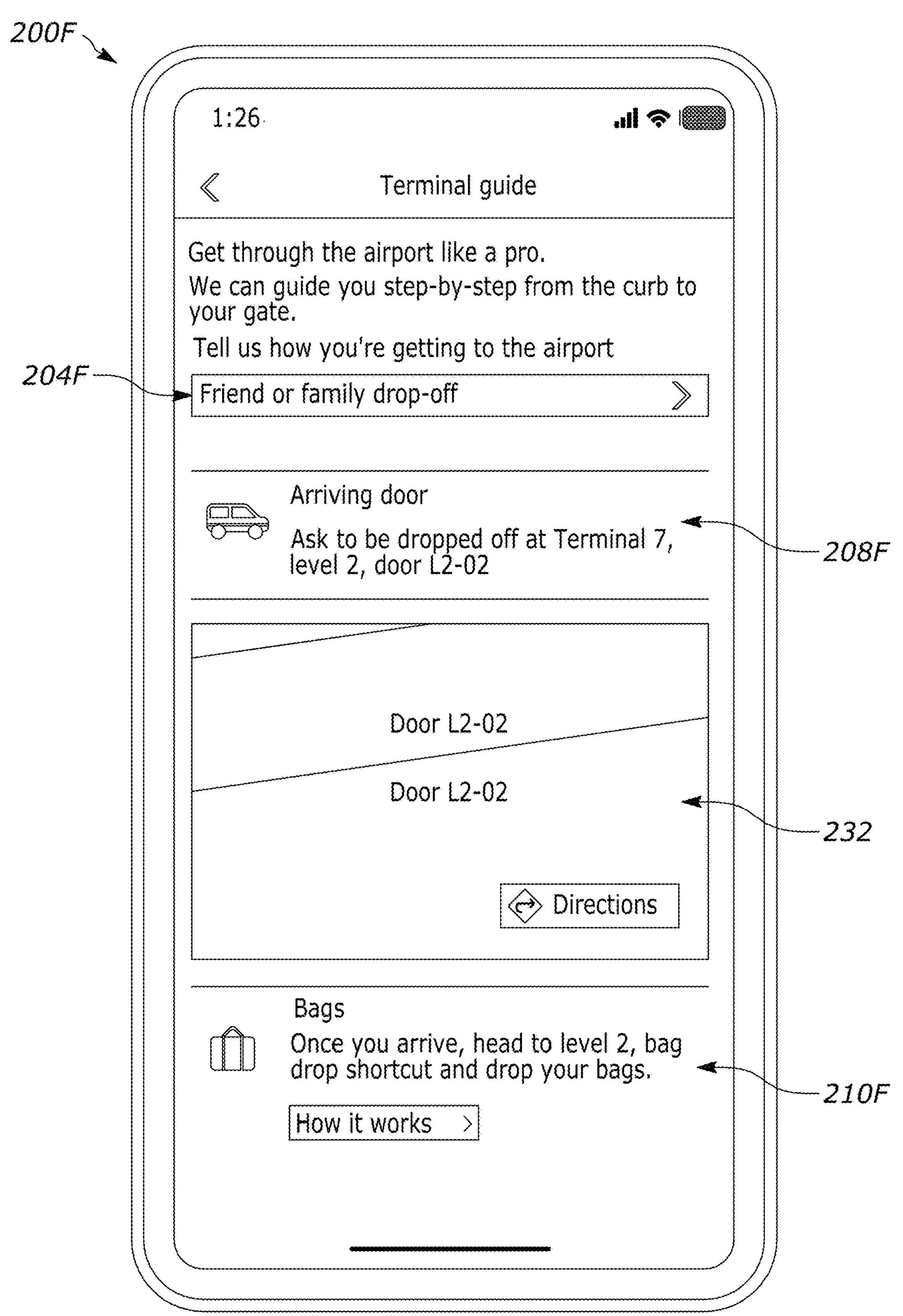

In some embodiments, each option on the list of selectable ground transportation options 228 may include an associated entrance landmark and accompanying instructions relating to the associated entrance landmark. For example, as shown in FIG. 2E, a user interface screen 200E for the user device 112 may display an entrance landmark 208E linked to the "CTA blue line train" ground transportation option selected in the ground transportation selection box 204E and instructions directing the user to enter the airport terminal from the train arrival location. In contrast, as shown in FIG. 2F, a user interface screen 200F for the user device 112 may display an entrance landmark 208F linked to the "friend or family drop-off" ground transportation option selected in the ground transportation selection box 204F and instructions directing the user be dropped off at a specific location in the departure terminal. It should be appreciated that the other entrance landmarks shown and described herein, such as entrance landmarks 208A and 208B, may likewise be linked to specific ground transportation options and accompanying instructions.

Furthermore, as shown in comparison between FIGS. 2E and 2F, selection of the different ground transportation options in the ground transportation selection box 204E and 204F may result in the path generating and selection module 108 selecting different bag drop landmarks 210E and 210F in the manner described herein (e.g., an interior bag drop shortcut in FIG. 2E and a curbside bag drop shortcut in FIG. 2F).

The bag drop landmark 210E in FIG. 2E may include a corresponding bag drop location map 230 and the entrance landmark 208F in FIG. 2F may include a corresponding entrance map 232. The corresponding bag drop location map 230 and the corresponding entrance map 232 may be generated by the map service 124 of FIG. 1.

Figure 2G:
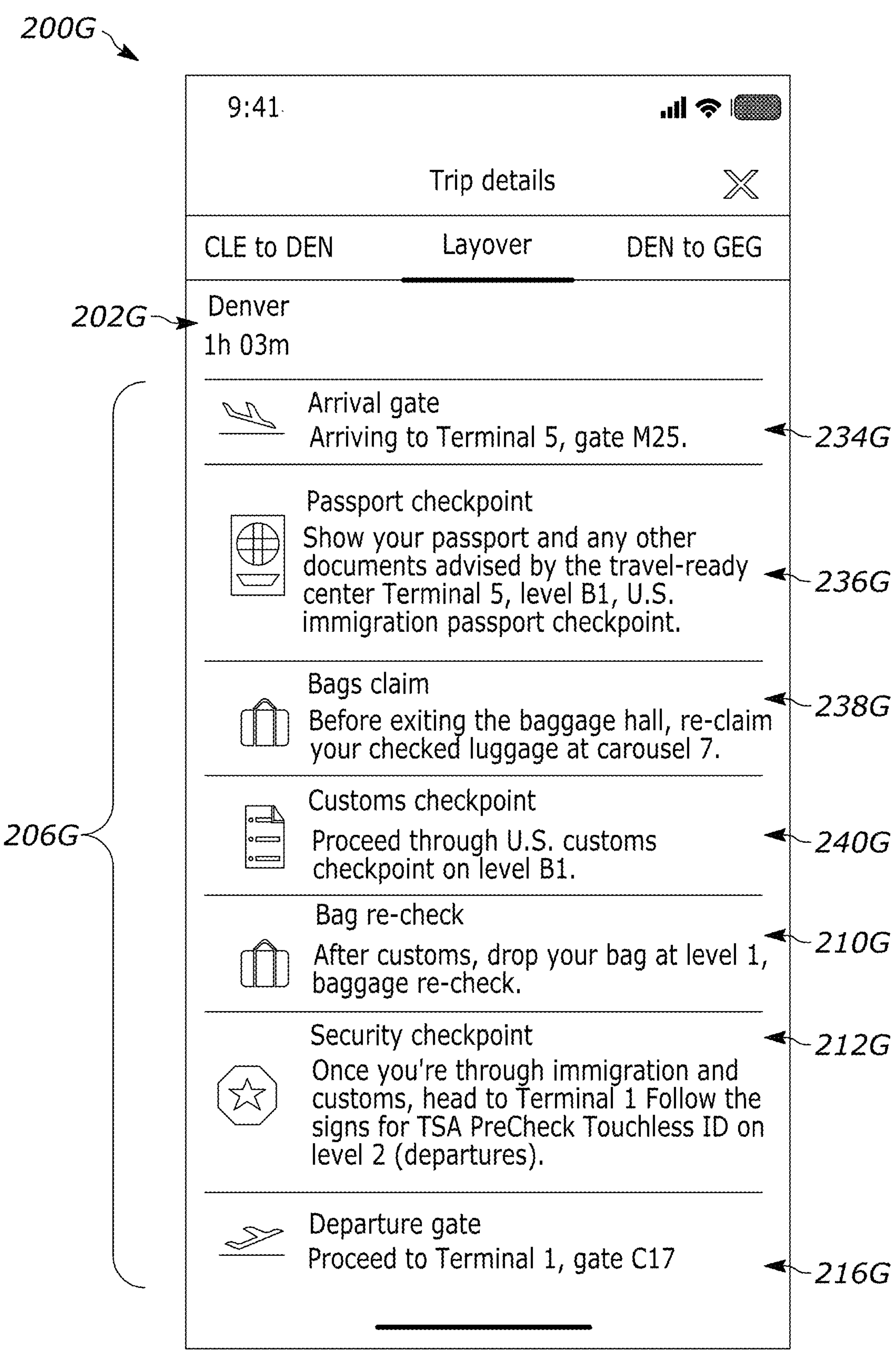
Figure 2H:
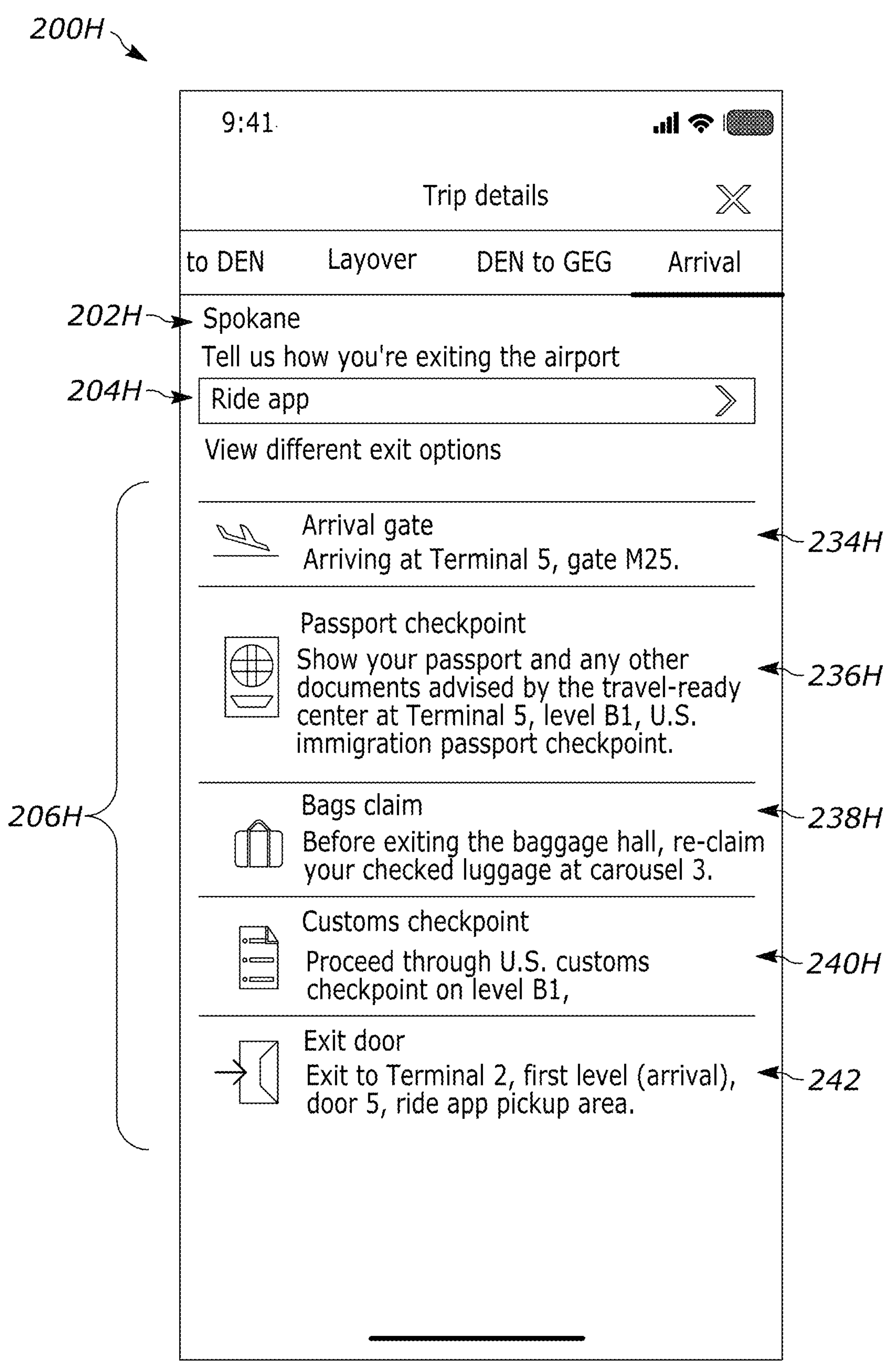

With reference now to FIGS. 2G and 2H, additional example user interface screens 200G and 200H for display of example paths 110 on the user device 112 are shown. In particular, the user interface screen 200G shows a layover segment and the user interface screen 200H of shows a final destination segment of respective example paths generated by the path generating and selection module 108 of FIG. 1. Furthermore, the user interface screens 200G includes an airport indicator 202G similar to airport indicators 202A and 202B and layover airport landmark locations 206G. The user interface screen 200H includes an airport indicator 202H similar to airport indicators 202A, 202B and 202G, a ground transportation selection box 204H similar to ground transportation selection boxes 204A, 204B, 204D, and 204F, and arrival airport landmark locations 206H.

As shown in FIG. 2G, the layover airport landmark locations 206G include, in path order, an arrival landmark 234G, a passport control landmark 236G, a bag claim landmark 238G, a customs checkpoint landmark 240G, a bag drop landmark 210G similar to the bag drop landmarks 210A and 210B, a security checkpoint landmark 212G similar to the security checkpoint landmarks 212A, 212B, and 212C, and a departure gate landmark 216G similar to the departure gate landmarks 216A, 216B, and 216C. As shown in FIG. 2H, the arrival airport landmark locations 206H include the arrival landmark 234H similar to the 234G, a passport control landmark 236H similar to the 236G, a bag claim landmark 238H similar to the 238G, a customs checkpoint landmark 240H similar to the 240G, and an exit location landmark 242.

Further detailed discussion of the layover airport landmark locations 206G and the arrival airport landmark locations 206H is included below with reference to FIGS. 1, 2G, and 2H.

The arrival landmarks 234G and 334H are example arrival landmarks selected by the path generating and selection module 108. In general, the arrival landmark indicates the location selected by the path generating and selection module 108 where the planned flight is scheduled to arrive at an airport (e.g., the arrival gate indicated in the airport location details 116 for a layover or arrival airport). In some embodiments, the arrival landmark may be a place holder arrival landmark for the path 110 in cases where an arrival gate was not assigned for the planned flight at the time the path 110 was generated.

The passport control landmarks 236G and 236H are example passport control landmarks selected by the path generating and selection module 108. In general, the passport control landmark indicates the location selected by the path generating and selection module 108 where the user should proceed for arrival passport control at a layover or final arrival airport. Specifically, for cases where the planned flight is an international flight, the path generating and selection module 108 may include the passport control landmark 236G or 236H in the path 110 for the segment of the path 110 associated with the first airport location located outside of the departure country.

The bag claim landmarks 238G and 238H are example bag claim landmarks selected by the path generating and selection module 108. In general, the bag claim landmark indicates the location selected by the path generating and selection module 108 where the user should proceed to pick up any checked bags at a layover or final destination airport. If the user data 114 indicates that no bags were checked at the destination airport, the path generating and selection module 108 may omit the bag claim landmark 238G or 238H from the path 110. Furthermore, the path generating and selection module 108 may omit the bag claim landmark 238G from the layover segment when the airport location details 116 indicate that any checked bags will be transferred by airport personnel (e.g., in domestic plane transfer situations).

The customs checkpoint landmarks 240G and 240H are example customs checkpoint landmarks selected by the path generating and selection module 108. In general, the customs checkpoint landmark indicates the location selected by the path generating and selection module 108 where the user should proceed for customs screening at a layover or final destination airport. For cases where the planned flight is an international flight, the path generating and selection module 108 may include the customs checkpoint landmark 240G or 240H in the path 110 for the segment of the path 110 associated with the first airport location located outside of the departure country.

The exit location landmark 242 is an example exit landmark selected by the path generating and selection module 108. In general, the exit landmark indicates the location selected by the path generating and selection module 108 where the user should exit the airport. Furthermore, like the entrance landmark, the path generating and selection module 108 may select the exit location landmark 242 based on portions of the user data 114 that indicate the ground transportation method the user of the user device 112 is using to depart from the arrival airport. In some embodiments, the ground transportation portions of the user data 114 may be set by user input to the ground transportation selection box 204H as shown in FIG. 2H.

Figure 3:
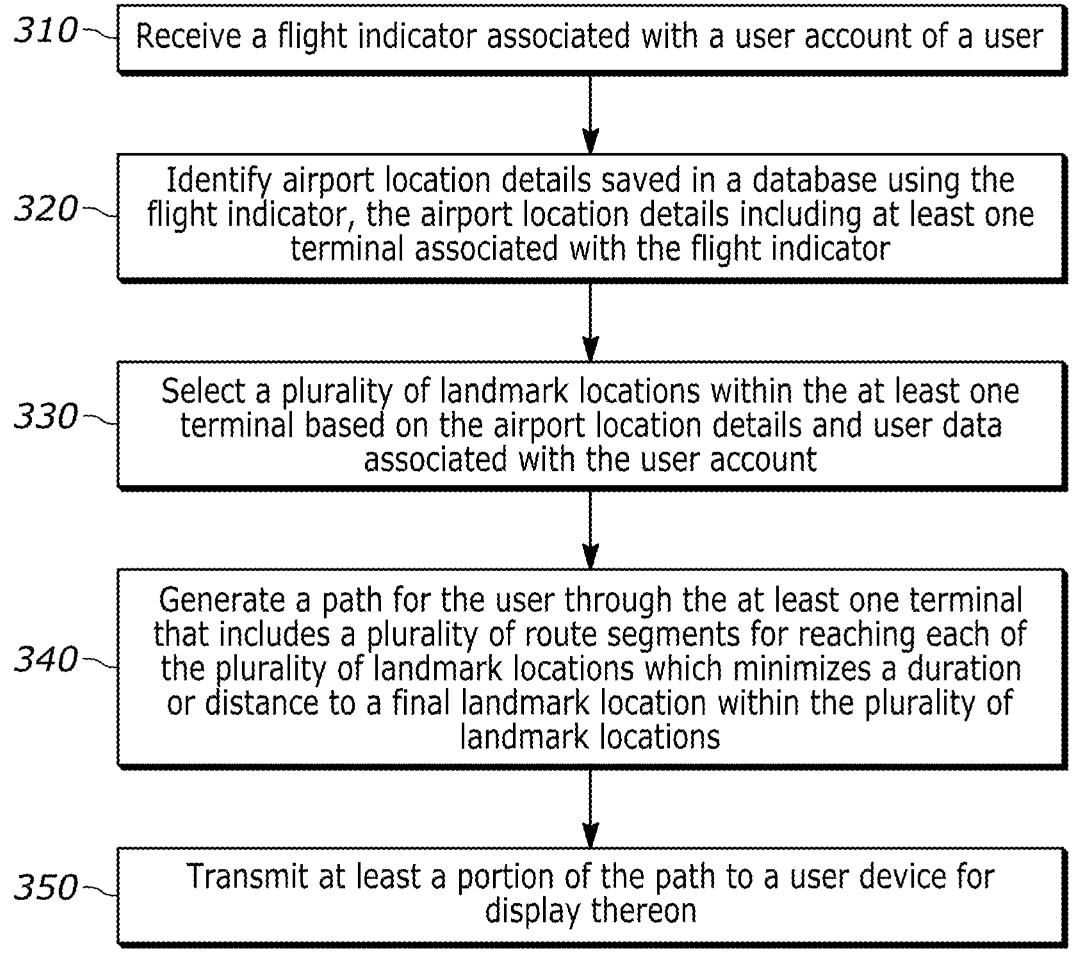
FIG. 3 is a flow diagram of an example method for generating a path through an airport terminal, in accordance with various embodiments disclosed herein.

FIG. 3 shows a method 300 for generating the path 110 for a user through an airport terminal. The method 300 may be performed by the processing unit 104 executing instructions stored on the memory unit 106.

At block 310, the method 300 includes receiving a flight indicator associated with a user account of a user.

At block 320, the method 300 includes identifying airport location details saved in a database using the flight indicator. The airport location details include at least one terminal associated with the flight indicator.

At block 330, the method 300 includes selecting a plurality of landmark locations within the at least one terminal based on the airport location details and user data associated with the user account.

At block 340, the method 300 includes generating a path for the user through the at least one terminal that includes a plurality of route segments for reaching each of the plurality of landmark locations which minimizes a duration or distance to a final landmark location within the plurality of landmark locations.

At block 350, the method 300 includes transmitting at least a portion of the path to a user device for display thereon.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality, and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

Upon reading this disclosure, those of skill in the art will appreciate still additional alternative structural and functional designs through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer system comprising:

one or more processors; and one or more non-transitory, computer-readable media storing instructions that, when executed by the one or more processors, cause the computer system to:

receive a flight indicator associated with a user account of a user;

identify airport location details saved in a database using the flight indicator, the airport location details including at least one terminal associated with the flight indicator;

select a plurality of landmark locations within the at least one terminal based on the airport location details and user data associated with the user account;

generate a path for the user through the at least one terminal that includes a plurality of route segments for reaching each of the plurality of landmark locations which minimizes a duration or distance to a final landmark location within the plurality of landmark locations, wherein the computer system selects the plurality of landmark locations and generates the path by:

identifying a plurality of types of landmark locations based on the airport location details and the user data; and for each of the plurality of types of landmark locations, selecting a landmark location from a set of candidate landmark locations corresponding to each of the plurality of types of landmark locations by:

constructing a set of candidate paths through the at least one terminal, wherein each candidate path includes candidate landmark locations corresponding to each of the plurality of types of landmark locations;

generating a score for each candidate path in the set based on an expected duration or distance of the candidate path; and selecting the path from among the set of candidate paths based on the score; and transmit at least a portion of the path to a user device for display thereon, wherein the path includes step by step navigation instructions for traversing the route segments between each of the selected landmark locations within the path.

2. The computer system of claim 1 wherein the instructions further cause the computer system to:

obtain a set of candidate landmark locations associated with the at least one terminal; and select at least one of the plurality of landmark locations from the set of candidate landmark locations according to a user preference or status included in the user data.

3. The computer system of claim 1 wherein at least one of the plurality of landmark locations within the path is included in an exclusive area of the at least one terminal when the user data includes an indication of access rights to the exclusive area of the terminal.

4. The computer system of claim 1 wherein the user data includes user input indicating an arrival or departure method to the at least one terminal, and wherein the plurality of landmark locations included within the path includes at least one landmark location in the at least one terminal associated with the arrival or departure method.

5. The computer system of claim 1 wherein the instructions, when executed by the one or more processors, cause the computer system to:

determine a trigger condition for displaying each route segment in the plurality of the route segments and corresponding landmark location of the path; and transmit the trigger conditions to the user device with the path.

6. The computer system of claim 5 wherein the trigger conditions include time values and/or user device sensor readings that indicate when the user device is to display the route segments and corresponding landmark locations.

7. The computer system of claim 1 wherein the instructions, when executed by the one or more processors, cause the computer system to:

detect a modification to the airport location details or user data;

revise the path based on the modification; and transmit at least a portion of the revised path to the user device.

8. The computer system of claim 7 wherein the modification includes an updated preference or status, a new gate assignment within the at least one terminal, a new terminal assignment different from the at least one terminal, or status change information on the plurality of landmark locations within the at least one terminal.

9. The computer system of claim 1 wherein the instructions further cause the computer system to:

determine an expected duration for traversing each route segment in the plurality of route segments; and provide indications of the expected durations to the user device for display.

10. The computer system of claim 9 wherein the expected duration includes an expected amount of time to pass through a landmark location associated with the route segment.

11. A computer-implemented method for generating a path for a user through an airport terminal, the method comprising:

receiving, at one or more processors, a flight indicator associated with a user account of a user;

identifying, by the one or more processors, airport location details saved in a database using the flight indicator, the airport location details including at least one terminal associated with the flight indicator;

selecting, by the one or more processors, a plurality of landmark locations within the at least one terminal based on the airport location details and user data associated with the user account;

generating, by the one or more processors, a path for the user through the at least one terminal that includes a plurality of route segments for reaching each of the plurality of landmark locations which minimizes a duration or distance to a final landmark location within the plurality of landmark locations, wherein selecting the plurality of landmark locations and generating the path includes:

identifying a plurality of types of landmark locations based on the airport location details and the user data; and for each of the plurality of types of landmark locations, selecting a landmark location from a set of candidate landmark locations corresponding to each of the plurality of types of landmark locations by:

constructing a set of candidate paths through the at least one terminal, wherein each candidate path includes candidate landmark locations corresponding to each of the plurality of types of landmark locations;

generating a score for each candidate path in the set based on an expected duration or distance of the candidate path; and selecting the path from among the set of candidate paths based on the score; and transmitting at least a portion of the path to a user device for display thereon, wherein the path includes step by step navigation instructions for traversing the route segments between each of the selected landmark locations within the path.

12. The computer-implemented method of claim 11 further comprising:

obtaining, by the one or more processors, a set of candidate landmark locations associated with the at least one terminal; and selecting, by the one or more processors, at least one of the plurality of landmark locations from the set of candidate landmark locations according to a user preference or status included in the user data.

13. The computer-implemented method of claim 11 further comprising:

determining, by the one or more processors, a trigger condition for displaying each route segment in the plurality of the route segments and corresponding landmark location of the path; and transmitting, by the one or more processors, the trigger conditions to the user device with the path.

14. The computer-implemented method of claim 13 wherein the trigger conditions include time values and/or user device sensor readings that indicate when the user device is to display the route segments and corresponding landmark locations.

15. The computer-implemented method of claim 11 further comprising:

detecting, by the one or more processors, a modification to the airport location details or user data;

revising, by the one or more processors, the path based on the modification; and transmitting, by the one or more processors, at least a portion of the revised path to the user device.

16. The computer-implemented method of claim 15 wherein the modification includes an updated preference or status, a new gate assignment within the at least one terminal, a new terminal assignment different from the at least one terminal, or status change information on the plurality of landmark locations within the at least one terminal.

17. The computer-implemented method of claim 11 further comprising:

determining, by the one or more processors, an expected duration for traversing each route segment in the plurality of route segments; and providing, by the one or more processors, indications of the expected durations to the user device for display.

18. The computer-implemented method of claim 17 wherein the expected duration includes an expected amount of time to pass through a landmark location associated with the route segment.

* * * * *